United States Patent [19]

Specht

[11] Patent Number: 5,389,464
[45] Date of Patent: Feb. 14, 1995

[54] BIPOLAR CELL STACK ELECTROLYTE CONTAINMENT FOR MOLTEN SALT BATTERIES

[75] Inventor: Steven J. Specht, Concord, Ohio

[73] Assignee: Westinghouse Electric Corporation, Pittsburgh, Pa.

[21] Appl. No.: 137,340

[22] Filed: Oct. 18, 1993

[51] Int. Cl.$^6$ .................... H01M 2/08; H01M 10/18
[52] U.S. Cl. .................... 429/152; 429/185; 429/210
[58] Field of Search ............... 429/152, 174, 185, 210, 429/112, 35, 36, 18

[56] References Cited

U.S. PATENT DOCUMENTS

| | | |
|---|---|---|
| 4,761,348 | 8/1988 | Kunz et al. ............ 429/35 |
| 5,141,828 | 8/1992 | Bennion et al. ............ 429/210 |
| 5,162,172 | 11/1992 | Kaun . | |
| 5,254,415 | 10/1993 | Williams et al. ............ 429/153 |

Primary Examiner—Anthony Skapars

[57] ABSTRACT

A containment for preventing the flow of liquid electrolyte from one cell electrode to adjacent cell electrodes. The battery being of the type formed of cells stacked in series, each cell having a positive electrode and a negative electrode that contain an electrolyte having a melting point lower than the battery operating temperature. Each cell being separated from an adjacent cell by a respective bipolar wall. The containment is comprised of a salt or salt mixture having a higher melting point than the electrolyte. The containment is placed adjacent the periphery of the cell components and may be provided as a packed powder, a fused or melted segment, or a flexible sleeve containing the higher melting point salt.

18 Claims, 3 Drawing Sheets

BIPOLAR CELL STACK ELECTROLYTE CONTAINMENT FOR MOLTEN SALT BATTERIES

BACKGROUND OF THE INVENTION

1. Field of the Invention

This invention relates to improvements in stacked multicell batteries, and more particularly to preventing ionically conductive paths from forming between adjacent cells and the battery case.

2. Description of the Prior Art

When constructing practical electrochemical cells in batteries there are two basic ways in which electrodes can be connected inside the cell or battery module case. These are series and parallel connections. In a bipolar battery design, the electrodes are hooked together in series, thus the voltage of the stack is n times that of a single cell, where n is equal to the number of cells in the stack. Each cell is comprised of a positive and a negative electrode separated from one another by some material.

To build a long life bipolar cell stack requires that there be no electrolyte path (i.e., no ionic leakage) formed between adjacent cells around the bipolar wall. This ensures that all of the current flow through the bipolar wall should be electronic in nature and there should be no ionic flow. Thus, the practical problem in building bipolar cell stacks is how to prevent ionically conducting liquid electrolyte paths from developing between adjacent cells. Because of the inability to completely contain the electrolyte within each cell, maximum performance and life of bipolar batteries has not yet been realized to date.

Referring to FIG. 1 which shows a prior art cell stack 10, the positive and negative electrodes 12 and 16 of each stack contain an electrolyte which is liquid at the operating temperature. The bipolar wall 18 shown in FIG. 1 separates adjacent cells and is designed to allow an electronic path between adjacent cells while not allowing an ionic path. If a path of electrolyte is allowed to travel around the bipolar wall 18, an ionic short develops reducing the effectiveness of the battery. When the liquid electrolyte contacts the bipolar wall 18, it may either ball up or it may run across the surface of the bipolar wall. When the liquid electrolyte is allowed to run across the surface of the bipolar wall, the wall is said to be wetted by the electrolyte. It is when the bipolar wall is wetted by the electrolyte that the electrolyte might travel in an undesirable path, is indicated by arrow 17, to the adjacent cell.

The ideal solution to the electrolyte leakage problem is to use a minimum amount of electrolyte which is completely contained within the individual electrodes and separator by capillary forces. In practice, however, this is almost impossible since more than this minimum amount of electrolyte is required to obtain the desired electrochemical performance from the battery.

The critical component to make a bipolar battery feasible is the development of a reliable bipolar wall edge seal to prevent the migration of electrolyte between adjacent cells and from the cells to the module case wall. If electrolyte bridges across adjacent cells or to the conductive battery case, ionically conductive paths will be formed which will degrade the capacity of the affected cells and result in an imbalance in the cell stack and, ultimately, failure of the entire battery.

Others have attempted to solve this electrolyte containment problem by forming a hermetic seal around the perimeter of each cell thereby permanently isolating each cell from adjacent cells and from the battery case. This approach requires a sophisticated insulating material that can withstand the high operating temperatures and yet is capable of being bonded to metal between the cell hardware components. The insulating material must be capable of withstanding chemical, thermal and mechanical effects imposed by the cell stack under all operating and environmental conditions. The assembly of this type of seal will result in high fabricating costs and low reliability due to the large area which must be perfectly sealed. The mechanical loading on the ceramic ring caused by expansion of the components during operation may limit this type of hermetic seal design to circular configurations in relatively small sizes (i.e., under five inches). This may impose severe packaging penalties and reduce the energy density for many potential battery applications. Therefore, alternative means are necessary to confine the electrolyte from migrating from the electrodes and separator around the bipolar wall.

SUMMARY OF THE INVENTION

I provide an electrolyte containment for bipolar cell stacks of molten salt batteries. Molten salt bipolar batteries using stacked electrolyte cell designs require that the small amount of electrolyte which escapes from the edges of the cell materials and wets the metallic bipolar wall, is prevented from flowing around the edges of the bipolar wall to adjacent cell electrodes or to the cell stack case. If an electrolyte path is formed, ionic conduction will occur and the battery stack performance will be degraded. This invention will place a barrier of a material which will react with the electrolyte that has escaped from the cell and immobilize it to prevent ionic conductive paths from forming.

A layer of a salt or salt mixture which has a higher melting point than the electrolyte salt or salt mixture used in the cell may be placed adjacent to the periphery of the cell components in contact with the bipolar wall to contact with any electrolyte which escapes from the cell materials. The cell electrolyte, which is molten at the operating temperature, will diffuse into the higher melting point salt which is solid at the cell operating temperature and mix with the higher melting point salt. The melting point of the resulting mixture will be higher than the melting point of the electrolyte and higher than the operating temperature of the battery so that the electrolyte/higher melt salt mixture becomes a solid which is not conductive. Causing the electrolyte to mix with the higher melting point salt and become solid prevents the further migration of the electrolyte around the bipolar wall. The higher melting point salt should have a substantially higher melting point than the electrolyte so that small amounts of the higher melting point salt will significantly raise the melting point of the resulting mixture. This property will reduce the amount of higher melting point salt which is required to immobilize a given amount of electrolyte.

In forming the electrolyte containment, the higher melting point salt may be placed as a packed powder bed adjacent to and in contact with the periphery of the cell materials. This placement will allow the higher melting point salt to immobilize the liquid and vapor components of the electrolyte which may escape from the periphery of the cell materials. The higher melting point salt may, of course, may be placed adjacent to but not in contact with the cell components so as to leave a space or gap therebetween.

The higher melting point salt may be bonded to the bipolar wall by fusing the higher melting point salt to the metal of the bipolar wall at a temperature slightly higher than the melting point of the higher melting point salt. This bonding of the higher melting point salt to the metal bipolar wall assures excellent contact of the containment to the bipolar wall and prevents any electrolyte from flowing under the higher melting point salt without reacting and being immobilized. Thus, the higher melting point salt may be applied as a coating to each face of the bipolar walls, or the higher melting point salt may extend through the entire height of the cell, connecting opposed bipolar wall faces of selected cells.

Flexible insulating materials or composites can be used as sleeves to contain the higher melting point salt powders in contact with the edge of the cell. Such sleeves of material may also be used in areas which are separated from the cell edge but are in contact with the bipolar wall between the edge of the cell and the edge of the bipolar wall to prevent electrolyte from escaping from the bipolar cell area. Boron nitride fibers in the form of felt or woven parts is an example of a suitable flexible material. Other suitable flexible materials include graphite or carbon fibers in the form of felt or woven parts in conjunction with an electrically insulating layer to form a composite structure which provides a resilient, flexible nonconductive layer. The sleeves may be filled or coated with the higher melting point salt to provide additional non-leakage properties.

A solid, preferably molded piece of the higher melting point salt can be fabricated and bonded to adjacent bipolar walls to form a hermetic seal between adjacent cells. The advantage of this approach is that if the solid piece of higher melting point salt becomes fractured or is not perfectly bonded to the bipolar walls, it will be self-sealing when electrolyte vapor or liquid contacts the imperfections and reacts with the higher melting point salt. The solid piece of higher melting point salt may also be self-bonding to the bipolar walls when it reacts with electrolyte liquid or vapor at the interface between the solid piece and the bipolar walls.

Other objects and advantages of the invention will become apparent from a description of certain present preferred embodiments thereof shown in the drawings.

DESCRIPTION OF THE PREFERRED EMBODIMENT

Figure 1:
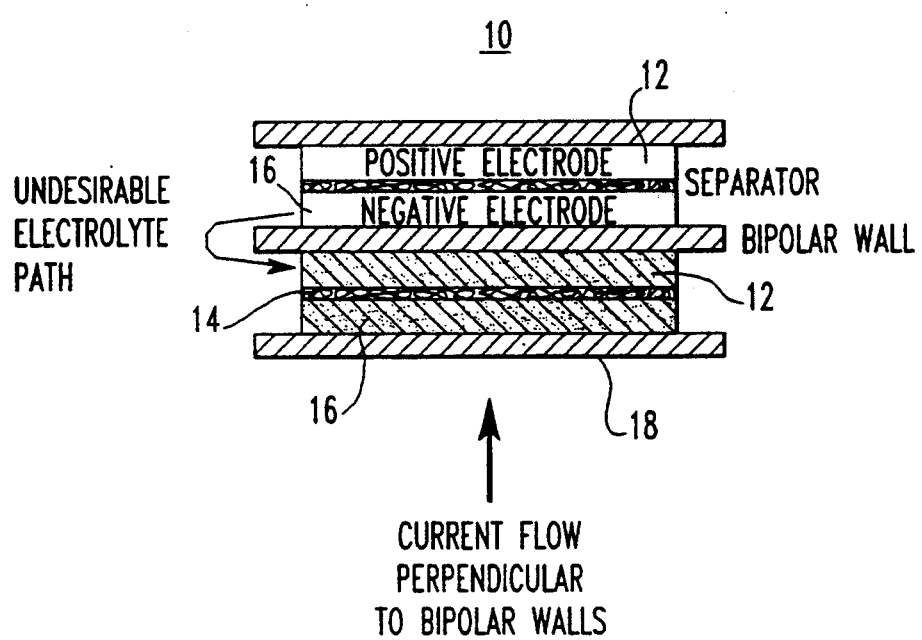
FIG. 1 is a schematic view of a prior art series stacked multicell battery.
Figure 2:
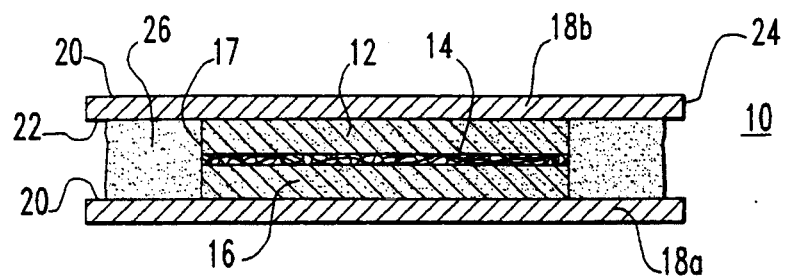
FIG. 2 is a cross sectional view of a first preferred embodiment of the electrolyte containment.

Referring first to FIG. 2, a first preferred electrolyte containment is shown incorporated on one cell 10 of a series stacked multicell battery. Each cell 10 of this type of battery has a porous positive electrode 12 and a porous negative electrode 16 that contain an electrolyte. A typical electrolyte is lithium halide having a melting point of approximately 445° C. Electrolytes are known that have a broad range of melting points ranging from room temperature to 500° C. The battery is then heated to an operating temperature. The operating temperature of the battery is higher than the melting point of the electrolyte, so that the electrolyte is liquid at the operating temperature. Typically, the positive and negative electrodes 12, 16 are separated by some type of separator 14 that allows ions to pass between the electrodes 12, 16 without allowing electrode material to pass between the electrodes 12, 16. The cell electrodes 12, 16 have an outer contour or periphery 17.

Each cell 10 is separated from an adjacent cell 10 by a respective bipolar wall 18. The bipolar walls 18, which are preferably sheets of metal such as molybdenum, are designed to allow electron flow between adjacent cells 10 while not allowing an ionic path between adjacent cells 10. Each bipolar wall 18 has an upper face 20 and a lower face 22. Thus, as shown in FIG. 2, the upper face 20 of one bipolar wall 18 faces or opposes the lower face 22 of the next bipolar wall 18. Therefore, each cell 10 is bounded by opposed faces 20, 22 of the bipolar walls 18.

A higher melting point salt 26, such as lithium fluoride powder is placed around the outer periphery 17 of the cell components (i.e., the electrodes 12, 16 and the separator 14) between the opposed faces of the bipolar walls 18 bounding each cell 10. The term "higher melting point salt" denotes a salt, combination of salts or combination of salts and inert materials whose melting point is greater than the operating temperature of the battery.

The higher melting point salt 26 may be placed in a powdered form on the bipolar wall 18. According to a first preferred embodiment shown in FIG. 2, a continuous length of the powdered higher melting point salt is placed around the outer periphery 17 of the cell components. The powdered higher melting point salt is then pressed or compacted onto the bipolar wall 18. The higher melting point salt powder may be packed by any convenient means such as by loading the powdered higher melting point salt into a die set which presses the powdered higher melting point salt and places it on the bipolar wall 18.

The higher melting point salt 26 may be configured in any shape but it is preferably provided in a continuous length so as to completely encircle the cell components along the face of the bipolar wall 18. Because the preferred stacked multicell battery is rectangular in cross section, the preferred shape of the seal is a picture frame shape. Thus, the higher melting point salt 26 is preferably placed along the rectangular distal edge 24 of the top face 20 of the bipolar wall 18 so that the higher melting point salt 26 is placed on an area resembling a picture frame. The term "distal edge" of the bipolar wall 18 denotes a thin area on each face 20, 22 of the bipolar wall 18 that extends a short distance from the outer periphery of the bipolar wall 18 towards the cell components. It is understood, however, that the higher melting point salt 26 may be located at any location on one or both of the faces 20, 22 of the bipolar walls so long as the higher melt salt 26 is placed around the cell components.

The higher melting point salt 26 is preferably placed on a top face 20 of the bipolar wall 18. The higher melting point salt 26 may extend the full height of the cell 10 and contact the bottom face 22 of bipolar wall 18 as shown in FIG. 2, or may extend from the top face 20 of bipolar wall 18 only part way towards the bottom face 22 of the opposed bipolar wall 18.

The melting point of the electrolyte used in the battery and the battery operating temperature are variables which are dependent upon the mixture of the electrolyte used in the battery. An electrolyte or mixture of electrolytes may be selected so as to arrive at an electrolyte having any one of widely varying melting points. Therefore, any composition may be selected for the electrolyte and may be selected for the higher melting point salt 26 so long as the melting point of the salt 26 is higher than the operating temperature of the battery and the operating temperature of the battery is higher than the melting point of the composition used as the electrolyte. Therefore, the higher melting point salt 26 and the electrolyte may be composed of very similar compounds with either or both having additional compounds that will either raise the melting point of the higher melting point salt 26 or lower the melting point of the electrolyte.

It is understood that the term "operating temperature" means not just the cell electrode operating temperature but the temperature of the heat source which is heating the cell electrodes. Heat sources for heating the cell stack (of which electrical resistance heaters are common in the industry) may be located external to the cell components. Therefore, the heat produced by the heat source may have to travel through the higher melting point salt 26 to heat the cell components. Thus, the temperature of the heating element must also be less than the melting point of the higher melting point salt 26.

As the cell stack is heated to a temperature above the melting point of the electrolyte, the electrolyte melts and may wet the exposed metal of the bipolar wall 18. When the film of molten electrolyte contacts the higher melting point salt 26, the two materials mix to form a new composition having a melting point higher than the operating temperature of the cell stack so that the mixture solidifies. The solidification of the electrolyte film on the metal surface of the bipolar wall 18 stops further spreading of the electrolyte and prevents the molten electrolyte from penetrating the higher melting point salt 26 and travelling beyond the distal edge 24 of the metal bipolar wall 18. The electrolyte is thus prevented from migrating and forming ionically conductive paths between adjacent cells 10 and between the cell bipolar wall 18 and the metal battery case (not shown).

In constructing each cell of the battery, the higher melting point salt 26 may be placed first and the cell components then may be provided. Masks may be used to prevent the higher melting point salt 26 from being placed on the bipolar wall 18 in locations where it should not be placed, such as the locations where cell components are to be placed. Alternatively, the cell components may be placed first on a bipolar wall and the higher melting point salt provided around the cell components.

The higher melting point salt 26 may be applied to the bipolar wall 18 by simply placing the salts 26 on a face of the bipolar wall 18. Alternatively, the higher melting point salts 26 may be fused to the bipolar wall 18 by elevating the temperature of the salt 26 or of the bipolar wall material to the melting point of the higher melting point salt 26. Also, the higher melt salt 26 may be applied by dissolving the higher melt salt 26 in a suitable solvent, applying the solution of solvent and higher melt salt to the desired areas of the bipolar wall 18, and then removing the solvent. Alternatively, the higher melt salt or salt mixture may be sprayed, such as by plasma spraying, onto the bipolar wall 18. It is understood that any convenient means of applying the higher melting point salt or salt mixtures to the bipolar wall 18 may be employed.

Figure 3:
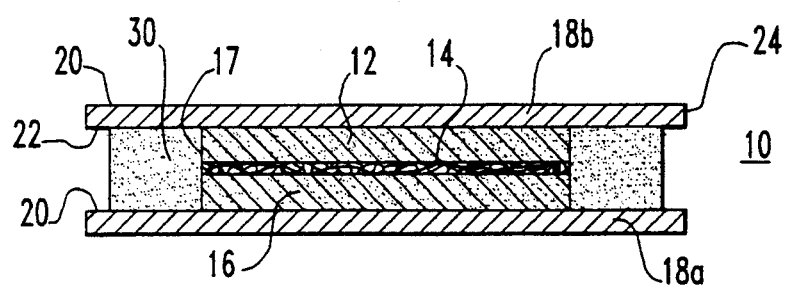
FIG. 3 is a cross sectional view of a second preferred embodiment of the electrolyte containment.

Referring next to FIG. 3, a solid fused piece 30 of the higher melting point salt 26 may be formed and placed between bipolar walls 18 and around the cell components. The solid piece 30 may be formed by placing the higher melting point salt 26 in a mold and then melting it to a temperature greater than the melting point of the higher melting point salt 26. The higher melting point salt 26 then sinters or melts into a solid piece 30. It is preferred that the solid piece 30 be continuous and, therefore, be formed with a centrally disposed cavity for the placement of the cell components therethrough. Since cell stacks are typically rectangular in cross section, the solid piece 30 is preferably configured in a "picture frame" shape.

Alternatively, several smaller solid pieces 30 may be placed between the bipolar walls 18 around the cell components. So long as each solid piece 30 of the higher melting point salt is placed sufficiently close to adjacent solid pieces 30, any electrolyte liquid or vapors that begin to travel through the space between adjacent solid pieces 30 will react with the higher melting point salt 26 and solidify. The solid piece or pieces 30 may be bonded or fused to either or both of the faces 20, 22 of the bipolar walls 18 such as by heating the interface between the solid piece 30 and the bipolar wall 18. Also, when a solid molded piece 30 of the higher melting point salt 26 is placed around the cell components between bipolar walls 18, the solid piece 30 of higher melting point salt may self-bond to the bipolar walls 18 by reaction with the electrolyte liquid or vapor from the electrolyte. If the solid piece 30 is bonded to the opposed faces 20, 22 of the bipolar walls 18, the higher melting point salt 26 provides a hermetic seal around the cell components.

It is understood that the solid piece 30 is not necessarily pure higher melting point salt 26. The solid piece 30 may be a mixture of higher melting point salt 26 and some inert materials such as magnesium oxide to tailor the thermal expansion characteristics of the solid piece 30. Inert materials may also be selectively added into the solid piece 30 to tailor the strength, flexibility and resiliency characteristics of the solid piece 30.

Figure 4:
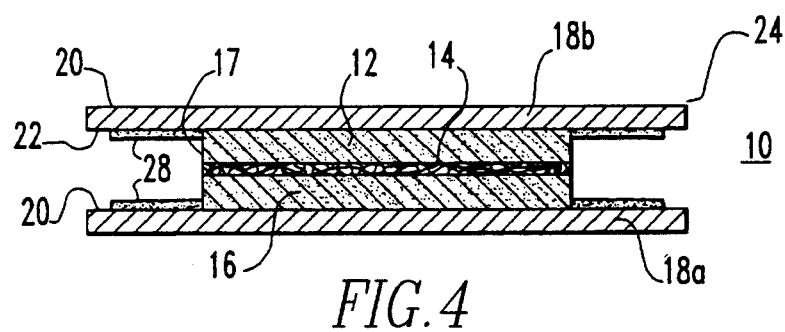
FIG. 4 is a cross sectional view of a third preferred embodiment of the electrolyte containment.
Figure 5:
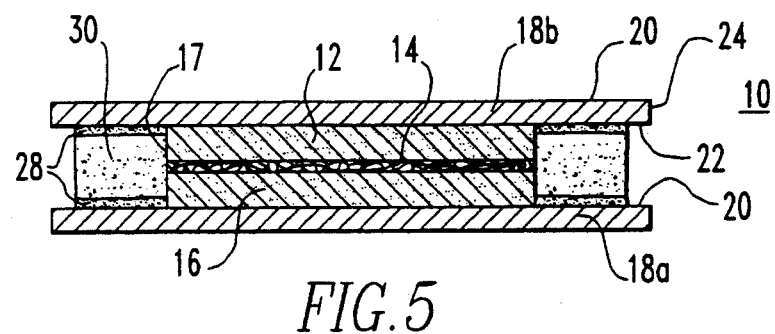
FIG. 5 is a cross sectional view of a fourth preferred embodiment of the electrolyte containment.

Referring next to FIG. 4, a layer or coating 28 of higher melting point salt 26 may be placed on one of or preferably both of the faces 20, 22 of two bipolar walls 18 that face one another and border a respective cell 10. Then, as shown in FIG. 5, a solid piece 30 of higher melting point salt 26 may be placed between the two bipolar walls 18 and between the two layers or coatings 28 of deposited higher melting point salt 26. Thus, a thin coating 28 of higher melting point salt, a solid piece 30 of higher melting point salt 26 and another thin coating 28 of higher melting point salt 26 are provided between each two bipolar walls 18.

The solid piece 30 may be bonded or fused to the coatings 28 on the opposed bipolar wall faces 20, 22. This provides an essentially hermetic seal around the cell components and prevents any leakage path from forming. Preferably, the solid pieces 30 are not fused to the coatings 28, but rather rest in contact against them. Not bonding the solid pieces 30 to the coatings 28 allows for some dimensional change in the cell 10 due to chemical, thermal or mechanical forces acting on the cell stack. When the solid piece 30 is not bonded to the coatings 28 the only leakage paths out from the cell components are the two narrow gaps between the solid piece 30 and the two coatings 28. Any electrolyte would have to pass through this narrow gap and therefore would react with the higher melting point salt there.

Figure 6:
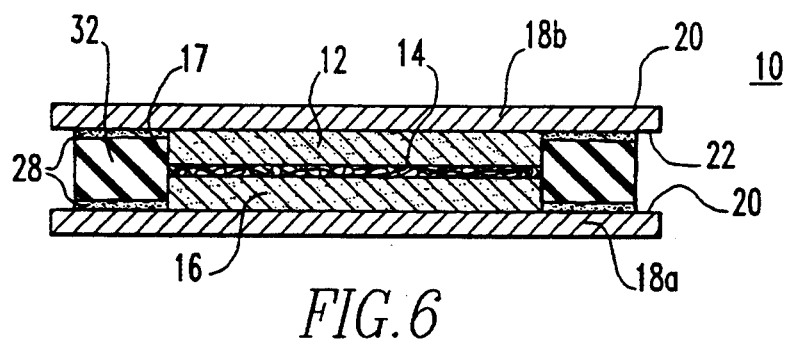
FIG. 6 is a cross sectional view of a fifth preferred embodiment of the electrolyte containment.
Figure 7:
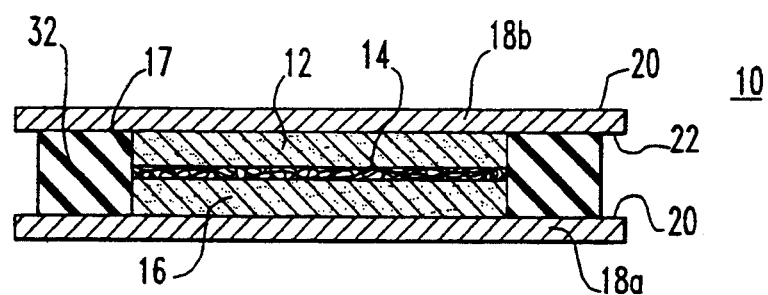
FIG. 7 is a cross sectional view of a sixth preferred embodiment of the electrolyte containment.

As shown in FIGS. 6 and 7, a retaining sleeve 32 may be provided in cooperation with the higher melting point salt 26. The sleeve 32 is preferably made of flexible insulating materials or composites such as boron nitride fibers in the form of felt or woven parts. Any material or composite that provides a resilient, flexible nonconductive layer may be employed. The sleeve 32 which may be porous or non-porous, solid, woven or compressed material, may be filled or coated with higher melting point salt 26 (not shown). The sleeve 32 may be premixed with a higher melting point salt 26 by dipping the sleeve 32 into a molten bath of the higher melting point salt 26 that was heated above the melting point of the higher melting point salt 26. Alternatively, a higher melting point salt 26 may be selected that is soluble in a solvent in which the sleeve 32 may be dipped into a solution containing the higher melting point salt and the solvent. The sleeve 32 would then be dried removing the solvent on any surface area of the sleeve material. The sleeve 32 is preferably continuous, however, the sleeve 32 may also be formed in segments.

Referring to FIG. 6, a sleeve 32 which may or may not be provided with higher melting point salt 26 is placed between two coatings 28 of higher melting point salt 26 on each of the bipolar walls 18 providing a boundary for the cell 10. Alternatively, any one of the bipolar walls 18 may be provided with a coating 28 and higher melting point salt 26.

As shown in FIG. 7, a sleeve 32 which is preferably provided with higher melting point salt 26 is placed between two bipolar walls 18 providing a boundary for the cell 10. The bipolar walls are not provided with coatings 28 of higher melting point salt 26. Because the sleeve has higher melting point salt 26 thereon, the sleeve may be fused or bonded to one or both of the metal faces 20, 22 of the bipolar walls 18.

Figure 8:
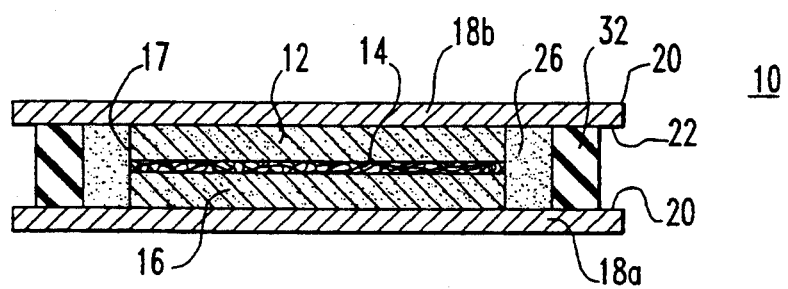
FIG. 8 is a cross sectional view of a seventh preferred embodiment of the electrolyte containment.
Figure 9:
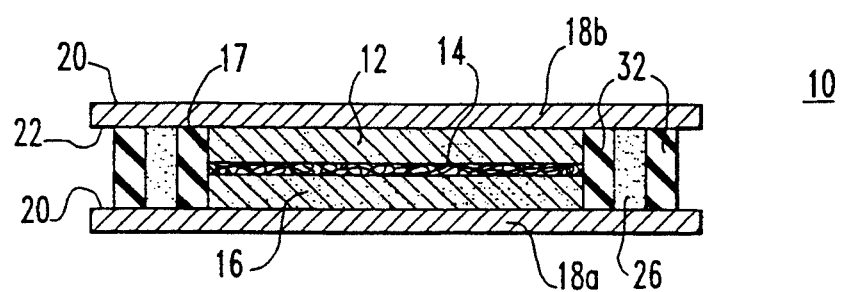
FIG. 9 is cross sectional view of an eighth preferred embodiment of the electrolyte containment.

Referring to FIG. 8, the retaining sleeve 32 may be placed around the higher melting point salt 26 to retain the higher melting point salt 26 in position around the cell components. The sleeve 32 may or may not be filled or coated with higher melting salt 26. Similarly, as shown in FIG. 9, the higher melting point salt 26 may be placed between two layers of retaining sleeves 32. Thus, a first retaining sleeve 32 surround the cell components, then a layer of higher melting point salt 26 may be placed around the retaining sleeve 32 and then another layer of a retaining sleeve 32 may be placed around the higher melting point salt 26. The retaining sleeve may be filled with or coated with the higher melting point salt 26 and then placed around the cell or fused to the bipolar walls 18 around the cell components.

Variations of the preferred embodiments may be made. For example, although lithium fluoride is described as an example of the preferred embodiment of the higher melting point salt, any inorganic salt which has a melting point higher than the melting point of the electrolyte and which forms a mixture with the electrolyte that is solid at the battery operating temperature may be used. Examples of suitable salts are lithium, sodium, potassium, rubidium and cesium compounds with fluorine, chlorine, bromine or iodine or mixtures of any of these salts. Furthermore, it is understood that any inert materials may be mixed into the higher melting point salt to achieve certain desired characteristics. Such inert materials may be added so long as they do not prevent the higher melting point salt and electrolyte from mixing or lower the melting point of the higher melting point salt to where the higher melting point salt will not effectively solidify the electrolyte.

While certain present preferred embodiments have been shown and described, it is distinctly understood that the invention is not limited thereto but may be otherwise embodied within the scope of the following claims.

I claim:

1. Multicell battery formed of cells stacked in series and comprising a peripheral seal each cell having a positive electrode and a negative electrode that contain an electrolyte having a melting point lower than an operating temperature of the battery, each cell further being separated from an adjacent cell by a respective bipolar wall, such that selected cells are bounded by opposed faces of two bipolar walls, the seal comprising:
   a higher melting point salt provided peripherally around the electrodes of selected cells on at least one of the cell's opposed bipolar wall faces, the salt having a melting point that is greater than the operating temperature of the battery.

2. The battery of claim 1 wherein the higher melting point salt is in the form of a powder.

3. The battery of claim 2 wherein the higher melting point salt powder is packed.

4. The battery of claim 1 wherein the higher melting point salt is formed as a single molded piece.

5. The battery of claim 4 wherein the seal is formed as at least one molded piece by heating the higher melting point salt to a temperature above its melting point before placing the seal in the cell.

6. The battery of claim 5 wherein the seal is adhered to at least one of the opposed faces of the bipolar walls bounding the selected cells.

7. The battery of claim 1 wherein the seal is formed as a coating applied to at least one of the opposed faces of the bipolar walls bounding the selected cells.

8. The battery of claim 7 further comprising at least one molded piece of higher melting point salt placed peripherally around the cell electrodes and between the opposed faces of the bipolar walls bounding the selected cells.

9. The battery of claim 8 wherein the at least one molded piece of higher melting point salt is adhered to the seal coating of the at least one of the opposed faces of the bipolar walls bounding the selected cells.

10. The battery of claim 7 further comprising a sleeve provided peripherally around the cell electrodes and between the opposed faces of the bipolar walls bounding the selected cells.

11. The battery of claim 10 wherein the sleeve is continuous.

12. The battery of claim 10 herein the sleeve is coated with the higher melting point salt.

13. The battery of claim 10 wherein the sleeve is adhered to the seal coating of the at least one of the opposed faces of the bipolar walls bounding the selecting cells.

14. The battery of claim 10 wherein the sleeve contains the higher melting point salt.

15. The battery of claim 1 wherein the seal is formed as a sleeve provided peripherally around the cell electrodes and between the opposed faces of the bipolar walls bounding the selected cells, wherein the sleeve has the higher melting point salt provided thereupon.

16. The battery of claim 1 wherein the higher melting point salt is mixed with inert materials.

17. The battery of claim 1 wherein the higher melting point salt is one of lithium fluoride, lithium chloride, lithium bromide, lithium iodide, sodium fluoride, sodium chloride, sodium bromide, sodium iodide, potassium fluoride, potassium chloride, potassium bromide, potassium iodide, and combinations thereof.

18. The battery of claim 1 wherein the higher melting point salt is applied around the cells by one of plasma spraying, solvent deposition, compacting higher melting point salt powder and melting higher melting point salt powder.

* * * * *